(12) United States Patent
Tao

(10) Patent No.: US 10,223,519 B2
(45) Date of Patent: Mar. 5, 2019

(54) BEAT ASSISTED TEMPORAL PRESSURE PASSWORD

(71) Applicant: Hai Tao, Dublin, CA (US)

(72) Inventor: Hai Tao, Dublin, CA (US)

( * ) Notice: Subject to any disclaimer, the term of this patent is extended or adjusted under 35 U.S.C. 154(b) by 163 days.

(21) Appl. No.: 15/613,279

(22) Filed: Jun. 5, 2017

(65) Prior Publication Data

US 2018/0349592 A1    Dec. 6, 2018

(51) Int. Cl.
*G06F 21/31* (2013.01)
*G06F 21/36* (2013.01)
*G06F 3/0488* (2013.01)
*G06F 21/84* (2013.01)

(52) U.S. Cl.
CPC ............ *G06F 21/36* (2013.01); *G06F 3/0488* (2013.01); *G06F 21/316* (2013.01); *G06F 21/84* (2013.01)

(58) Field of Classification Search
CPC ...... G06F 21/36; G06F 3/04883; G06F 21/31; G06F 21/316
USPC ............. 341/22, 36; 382/115; 340/5.54, 5.3, 340/5.52; 713/183
See application file for complete search history.

(56) References Cited

U.S. PATENT DOCUMENTS

| | | | | |
|---|---|---|---|---|
| 4,621,334 A * | 11/1986 | Garcia | ................... | G06F 21/32 382/115 |
| 4,805,222 A * | 2/1989 | Young | ................... | G06F 21/316 382/115 |
| 5,557,686 A * | 9/1996 | Brown | ................... | G06F 21/316 340/5.51 |
| 5,995,026 A * | 11/1999 | Sellers | ................... | G06F 3/0202 341/22 |
| 6,509,847 B1 * | 1/2003 | Anderson | ............. | G06F 1/1616 178/18.01 |
| 8,125,312 B2 * | 2/2012 | Orr | ........................ | G08C 19/00 340/5.3 |
| 8,164,573 B2 * | 4/2012 | DaCosta | ............... | G06F 3/0418 178/18.01 |
| 8,346,217 B2 * | 1/2013 | Crawford | ............. | H04W 12/06 455/410 |
| 8,401,522 B2 * | 3/2013 | Crawford | ................ | G06F 21/31 455/410 |
| 8,536,978 B2 * | 9/2013 | Coggill | ................... | G06F 21/36 340/5.54 |
| 8,941,466 B2 * | 1/2015 | Bayram | ................ | G06F 21/316 340/5.52 |
| 8,976,128 B2 * | 3/2015 | Moore | ................ | G06F 3/04883 345/173 |
| 9,069,460 B2 * | 6/2015 | Moore | ................ | G06F 3/04883 |
| 9,262,603 B2 * | 2/2016 | Dow | ........................ | G06F 21/31 |
| 9,390,244 B2 * | 7/2016 | Lynch | ................... | G06F 21/316 |
| 9,626,815 B2 * | 4/2017 | Li | ........................ | G07C 9/00134 |
| 2012/0126941 A1 * | 5/2012 | Coggill | ................... | G06F 21/36 340/5.54 |

* cited by examiner

*Primary Examiner* — Albert K Wong

(57) ABSTRACT

A beat assisted temporal pressure password authentication method in which a user enters a password by pressing a touch interface, and holding the pressure within one of multiple pressure ranges for passing certain number of beats, for one or more times. A password is then produced as a sequence of the pressure range code and the count of the beats passed in that pressure range.

20 Claims, 11 Drawing Sheets

BEAT ASSISTED TEMPORAL PRESSURE PASSWORD

FIELD OF THE INVENTION

This invention relates to temporal pressure password authentication schemes and devices.

BACKGROUND OF THE INVENTION

Traditional authentication schemes, such as textual passwords, PINs, and graphical passwords suffer from the shoulder surfing issue, namely an attacker can steal a password by looking over the victim's shoulder when a password is entered. Losing password credentials from shoulder surfing often results in financial loses, critical information leaking, and other serious consequences.

Pressure passwords, which encode the variations of pressure along a period as a password, can effectively resist shoulder surfing because it is hard to measure pressure visually, even at a proximity or with a desired observing angle.

U.S. Pat. No. 6,509,847 to Glen J. Anderson, issued on Jan. 21, 2003, for example, discloses a method for inputting an access code via temporal variations in the amount of pressure applied to a touch interface. In this invention, the temporal pressure variation is converted to a digital code which can be compared with a stored code template.

Similarly, U.S. Patent application US20120126941, by Henry Dunstan COGGILL, Slough (GB), published on May 24, 2012, teaches another pressure password for a touchscreen device. Under this scheme, a user is required to press multiple touch regions as a password.

However, current pressure password authentication methods suffer from common usability and security drawbacks:

First, current pressure passwords are difficult to remember. The variation of pressure is often very abstract, and can be a challenge for a user to remember. Because of this, users might choose simple passwords, such as short passwords or with simple rhythms. These simple passwords are subject to brute force attacks.

Second, current pressure passwords are not secure. The action of pressing a touch interface or changing the pressure is still subject to be detected by an advanced attacker. For example, when a user presses a touch interface with his or her fingers, the color of the finger tips and/or the angles of the finger joints may change accordingly. An advanced attacker can then measure the interval between each pressure change, and get the whole password. In many cases, an attacker may have a video recorded for the process when a password is entered, then the password is subject to be stolen by replaying the video for multiple times.

SUMMARY OF THE INVENTION

This invention, "Beat Assisted Temporal Pressure Password", is directed to improve the usability and the security of the current pressure password schemes. In the present invention, a user enters a password by pressing a touch interface (e.g. a button), and holding the pressure within one of multiple pressure ranges for passing certain number of beats generated by a beating process (e.g. continuous vibrations from a vibrator with fixed or randomized intervals), for one or more times. A password is then produced as a sequence of the pressure range code and the count of the beats passed in that pressure range.

This invention improves the usability by introducing a "beating" process to guide users to enter pressure passwords. Beating effectively provides users a hint or a guidance in the temporal dimension for entering a pressure password. Beating makes it easier for a user to make decisions when to change the pressure to the next range. Beating also provides a feedback for a user to indicate or confirm if he or she is holding the pressure in the right pressure range. This invention also makes it clear to users by introducing "pressure ranges" which define clearly the boundaries between pressure ranges.

This invention also improves the security, as the beating process, especially with randomized intervals, is a kind of hint or guidance that is only available to the user but to any others. Even someone can watch very closely or can watch a recorded video for multiple times, it is very hard to observe beatings (e.g. vibrations) visually. Therefore, it is hard for an attacker to detect how long a user holds in a pressure range.

Furthermore, this invention provides a definite way for encoding a password, as opposed to current pressure password schemes which usually rely on a tolerance method to compare two passwords. Instead of having to memorize an abstract rhythm, users can memorize a concrete password encoding in this invention.

The password space of this invention is comparable to PINs. For example, in a 3-layer pressure range implementation, if the maximum beat count in each pressure range is 5, and the pressure ranges passed (with at least one beat) is 4, then the password space (the total number of variations possible) is $(3\times5)^4=50625$, which is 5 times larger than the password space of a 4-digit PIN.

This invention can be used in many areas. For example, this invention can be used on mobile devices (such as phones, tablets, or laptops) for screen locking or application authentications. This invention can also be used on padlocks, door locks, ATMs, safes, POS terminals, or other devices which require authentications. This invention can also be combined with another authentication method (such as fingerprint authentication, textual password, PIN, or pattern lock etc.) to improve the security. This invention can also be used on products designed for people with visual disabilities.

BRIEF DESCRIPTION OF THE DRAWINGS

The invention will now be described in more detail with reference to the accompanying drawings, in which.

DETAILED DESCRIPTION OF THE INVENTION

Figure 1:
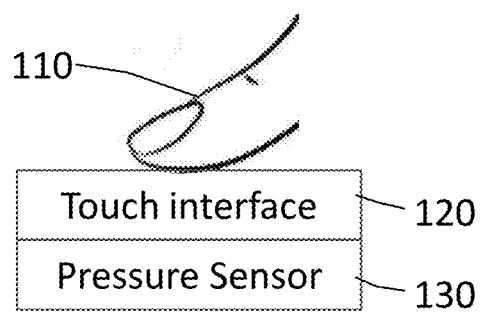
FIG. 1 shows that a finger touches on a touch interface, and a pressure sensor measures the pressure on the touch interface.

In the present invention, a user enters a password by pressing a touch interface (e.g. a button), and holding the pressure within one of multiple pressure ranges for passing certain number of beats generated by a beating process (e.g. continuous vibrations from a vibrator with fixed or randomized intervals), for one or more times. A password is then produced as a sequence of the pressure range code and the count of the beats passed in that pressure range.

A pressure range is a range of pressure. "Pressure" can be denoted by "p"; "Pressure range" can be denoted by "PR". Pressure range 1 (denoted as "PR1") is the range of pressure between P1_min and P1_max (P1_min<=p<=P1_max); Pressure range 2 (denoted as "PR2") is the range of pressures between P2_min and P2_max (P2_min<=p<=P2_max); Pressure range n (denoted as "PRn") is the range of pressures between Pn_min and Pn_max (Pn_min<=p<=Pn_max).

A "n-layer pressure range implementation of this invention" means there are n layers of pressure ranges in the implementation, denoted as "PR1", "PR2", . . . , and "PRn" respectively, in the order from low to high pressure.

Therefore, "2-layer pressure range implementation" means that there are 2 layers of pressure ranges in this implementation, denoted as "PR1" and "PR2" respectively, in the order from low to high pressure; "3-layer pressure range implementation" means that there are 3 layers of pressure ranges in this implementation, denoted as "PR1", "PR2", and "PR3" respectively, in the order from low to high pressure.

Given a value of pressure "p", a function "get_pr(p)" may output the corresponding pressure range code (denoted by "n"). For example, if (P2_min<=p<=P2_max), then get_pr (p)=2, meaning p is within the pressure range PR2. If p is not within any pressure range, namely p is in the gaps between pressure ranges, then n=0. n is used in the password encoding to represent the pressure range.

The values of P1_min, P1_max, P2_min, P2_max, Pn_min, and Pn_max can be determined and adjusted in an implementation of this invention to optimize the usability and security. There may be no gaps between pressure ranges (namely P1_max=P2_min, P2_max=P3_min, . . . , or Pn−1_max=Pn_min).

When the pressure enters a pressure range, a beating process starts. When the pressure leaves a pressure range, the beating process stops.

Beating provides a guidance to help a user enter a pressure password. Beating is generated by a beat generator. Beating should be available only to the user but to other people. For example, beating can be implemented in a haptic form, such as physical vibrations. While entering a password by pressing the touch interface with a finger or a stylus, only the user can feel the vibrations. It is very hard for other people to detect the vibrations without touching on the device.

The magnitude of the vibration can change to differentiate pressure ranges. For example, the magnitude of vibration may be stronger in a high-pressure range and may be weaker in a low-pressure range.

The vibration may have different patterns to differentiate pressure ranges. For example, a single-vibration may represent a low-pressure range and a quick double-vibration may represent a high-pressure range. A quick triple-vibration may represent an even higher pressure range.

Vibrations can be generated by a vibrator. A vibrator is a mechanical device to generate vibrations. The vibrator may include an electric motor. Vibrators are commonly equipped on mobile devices nowadays. Generating vibrations is well-known in the art.

Beating may also be implemented in the form of sound. The user may wear an earphone or a headset to hear the beating. When a user enters a pressure password with an earphone or headset, only the user can hear the beating while other people cannot.

Beating may also be implemented in the form of flashing light. The light source may be mounted in a position so that only the user can see the light. For example, when this invention is used in an ATM machine, a light source can be mounted at a position so only the user standing in the right front of the ATM can see the light while other people cannot.

The intervals of the beating may be fixed or randomized. Randomized beating intervals may confuse attackers and may prevent the password temporal information from leaking. A random interval may be generated by a function denoted as "random(min, max)" where "min" and "max" define the lower and upper limits. A larger value of "min" or "max" may provide a user more time to react to a beat, but on the other hand will make entering a password slower; a smaller value of "min" or "max" may provide a user less time to react to a beat, but on the other hand will make entering a password faster. "min" and "max" can be determined and adjusted in an implementation of this invention to optimize the usability and security. Generating a random number, or generating a random interval, is well-known in the art.

Referring to the drawings, FIG. 1 shows that a finger 110 touches on a touch interface 120, and a pressure sensor 130 measures the pressure on the touch interface 120. When a user touches the touch interface 120 with an input device (e.g. a finger 110 or a stylus), the pressure sensor 130 measures the pressure and provides a measurement.

Pressor sensors 130 are sensitive to touch, force or pressure, and may be made using light (optical), electricity or magnetism. Pressure sensors 130 are commonly equipped on mobile devices (such as smart phones, tablets, or laptops) nowadays, and measuring pressure is well-known in the art. For example, a capacitive sensor, involves two electrodes separated by a compressible dielectric structure. When pressure is applied, the gap decreases and capacitance rises. For another example, the iPhone 7 series smart phone features a pressure-sensitive home button that uses Apple's Force Touch technology. When pressing the home button, it will feel like it's clicking, but that sensation is generated by a haptic feedback engine.

Figure 2:
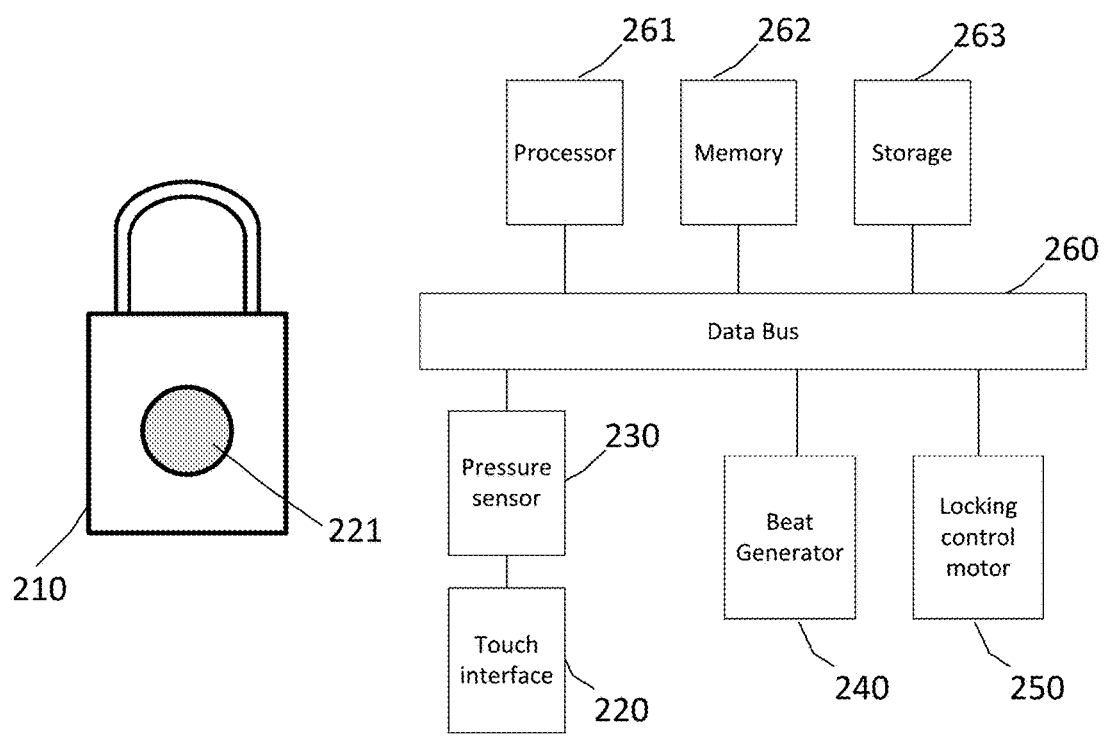
FIG. 2 shows an exemplary electric padlock having a touch interface wherein the touch interface is a button.

Referring to the drawings, FIG. 2 shows an exemplary electric padlock 210. The electric padlock 210 comprises of a touch interface 220, a pressure sensor 230, a beat generator 240, a processor 261, a memory 262, a storage 263, a data bus 260, and a locking control motor 250. Although the electric padlock is shown in FIG. 2 as including certain components, in other embodiments, the electric padlock may include more or less components to implement more or less functionalities.

The touch interface 220 may be a button 221. The touch interface 220 may be placed in the center of one side of the padlock 210 or any position convenient for the user to press. The size and the shape of the touch interface 220 may be determined and adjusted to fit the size and the shape of the padlock 210. The button 221 may be made of rubber, steel, plastic, glass, or other materials.

The pressure sensor 230 is capable to measure the pressure on the touch interface 220. The pressure sensor 230 depicted in FIG. 2 may be an embodiment of the pressure sensor 130 depicted in FIG. 1.

The beat generator 240 is configured to generate at least one beat. The beat generator 240 may be a vibrator or other suitable beat generating devices.

The processor 261 may be a microprocessor which can execute program instructions. The processor 261 is an electronic circuit which performs operations on some data source, usually memory or some other data stream.

The memory 262 may be in the form of dynamic random-access memory (DRAM) or static random-access memory (SRAM). Memory 262 is used to store information for immediate use for the processor 261.

The storage 263 may be in the form of Solid State Disk (SSD), flash drive, or other suitable storage device which can store passwords and/or program instructions.

The data bus 260 is a communication system that transfers data between components inside an electric lock, a mobile device, or a computing system.

The locking control motor 250 unlocks and/or locks a padlock 210 by physically moving a bolt or a latch. The locking control motor 250 may connect to a bolt, or a latch by an actuator. The locking control motor 250 may be controlled by program instructions based on the result of an authentication by comparing a password entered by a user to a password previously set up and is stored in the storage 263. For example, when a user entered a password correctly, the program instructions trigger an electrical signal to the locking control motor 250 which then moves the bolt or the latch to unlock the padlock 210.

Figure 3:
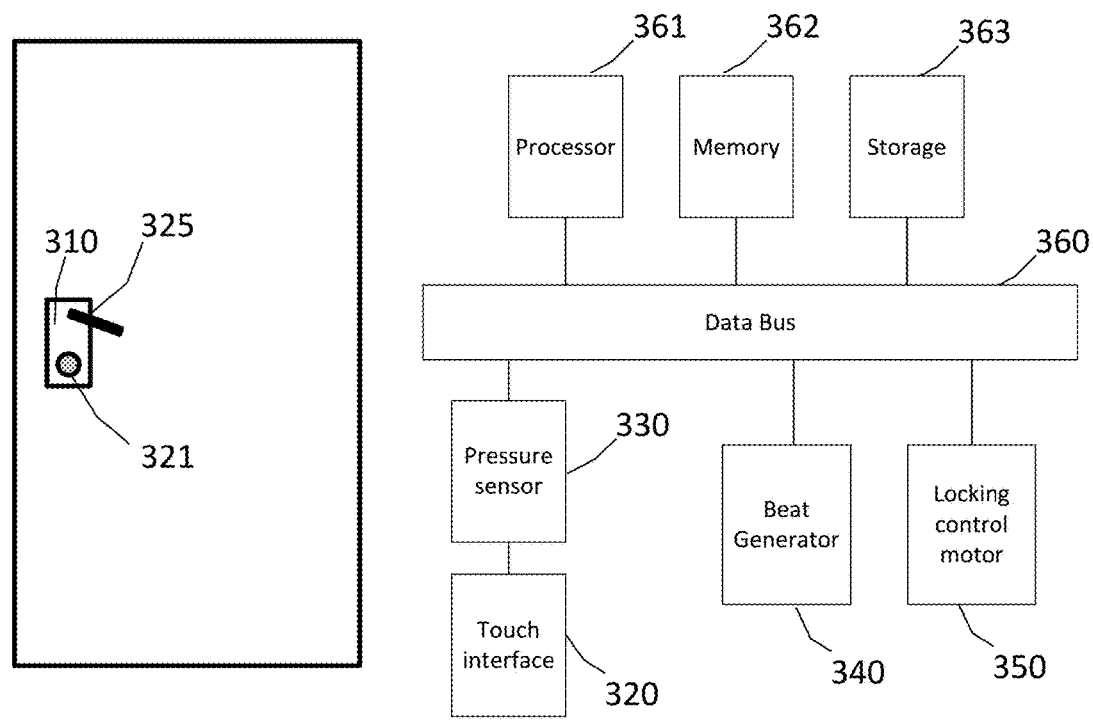
FIG. 3 shows an exemplary electric door lock having a touch interface wherein the touch interface is a button.

Similarly, referring to the drawings, FIG. 3 shows an exemplary electric door lock 310 having a touch interface 320 wherein the touch interface 320 is a button 321. The electric door lock 310 comprises of a touch interface 320, a handle 325, a pressure sensor 330, a processor 361, a memory 362, a storage 363, a data bus 360, a beat generator 340, and a locking control motor 350. The touch interface 320, the button 321, the pressure sensor 330, the processor 361, the memory 362, the storage 363, the data bus 360, the beat generator 340, and the locking control motor 350 depicted in FIG. 3 may be embodiments of the touch interface 220, the button 221, the pressure sensor 230, the processor 261, the memory 262, the storage 263, the data bus 260, the beat generator 240, and the locking control motor 250 depicted in FIG. 2, respectively.

The handle 325 is an attached object or mechanism used to manually open or close a door. The handle 325 can be made of wood, steel, or other materials.

Figure 4:
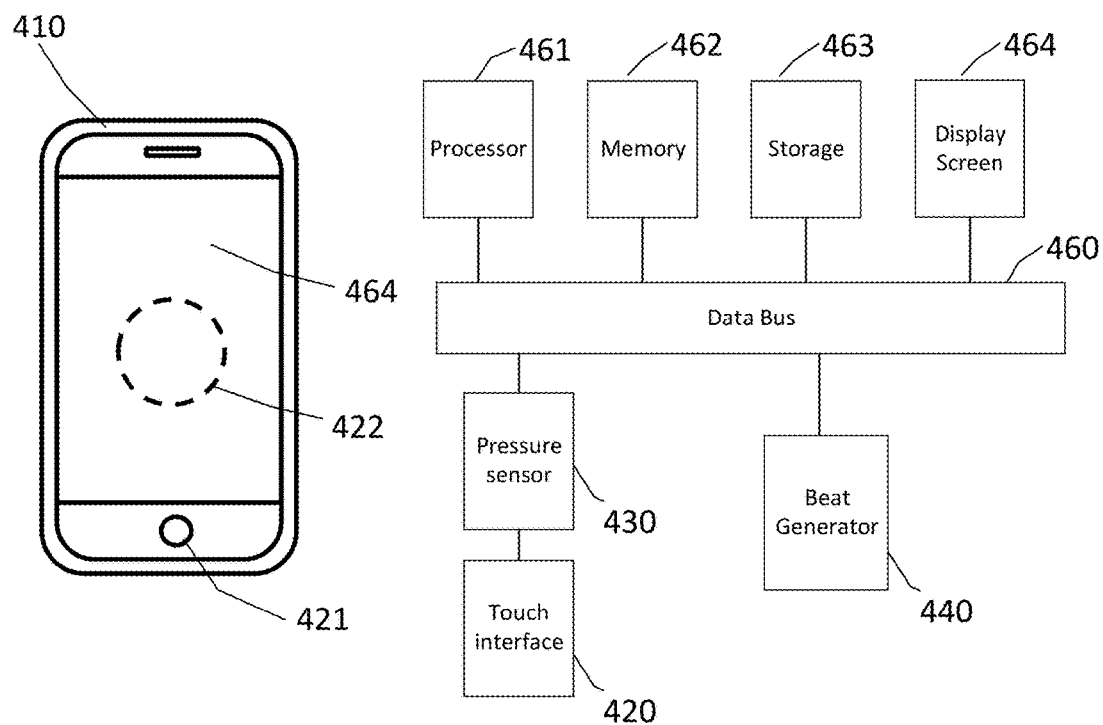
FIG. 4 shows an exemplary mobile device having a touch interface wherein the touch interface is a home button or an area on a touch screen.

Referring to the drawings, FIG. 4 shows an exemplary mobile device 410 having a touch interface 420 wherein the touch interface is a home button 421 or an area 422 on the display screen 464. The mobile device 410 comprises of a touch interface 420, a pressure sensor 430, a beat generator 440, a processor 461, a memory 462, a storage 463, a display screen 464, and a data bus 460. The touch interface 420, the pressure sensor 430, the processor 461, the memory 462, the storage 463, the data bus 460, and the beat generator 440 depicted in FIG. 4 may be embodiments of the touch interface 220, the pressure sensor 230, the processor 261, the memory 262, the storage 263, the data bus 260, and the beat generator 240 depicted in FIG. 2, respectively.

The home button 421 is a button commonly equipped on mobile devices. This includes, but not limited to, a home button on an iPhone 8 which takes a user to the home screen and provides other convenient shortcuts.

The area 422 on the display screen 464 may locate in the center of the display screen 464. The position and the size of the area 422 on the display screen 464 can be determined and adjusted to optimize the usability and security.

The display screen 464 may be a touch screen. A touch-screen is an input and output device commonly equipped on mobile devices such as smart phones or tablets. A user can give input or control the device through simple or multi-touch gestures by touching the screen with a special stylus and/or one or more fingers. The touchscreen enables the user to interact directly with what is displayed, rather than using a mouse, touchpad, or any other such device.

Figure 5:
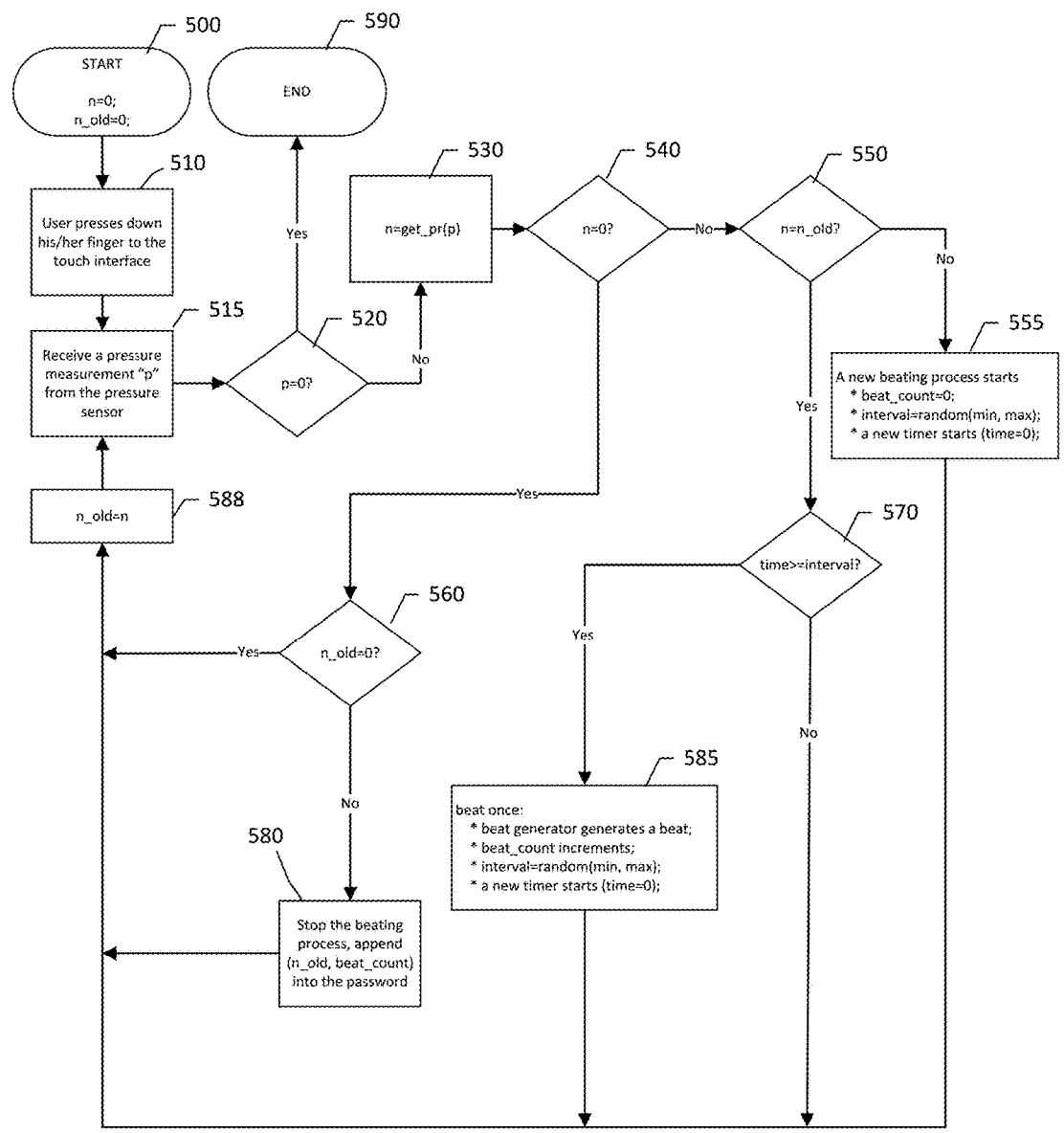
FIG. 5 is a flow chart illustrating how a password may be entered, how a beating process may start, beat, and stop, and how a password may be encoded.

FIG. 5 is a flow chart illustrating how a password may be entered, how a beating process may start, beat, and stop, and how a password may be encoded.

At step 500, a user starts to enter a password with n=0 and n_old=0 where n denotes the pressure range code and n_old denotes the previous pressure range code.

At step 510, the user presses down his or her finger to a touch interface which may be the touch interface 120 depicted in FIG. 1, the touch interface 220 depicted in FIG. 2, the touch interface 320 depicted in FIG. 3, and/or the touch interface 420 depicted in FIG. 4.

At step 515, a pressure sensor (which may be the pressure sensor 130 depicted in FIG. 1, the pressure sensor 230 depicted in FIG. 2, the pressure sensor 330 depicted in FIG. 3, and/or the pressure sensor 430 depicted in FIG. 4.) provides a measurement (denoted by "p") for the pressure on the touch interface.

At step 520, if the pressure measurement p is not zero, then go to step 530.

At step 530, the function "get_pr(p)" outputs a pressure range code which is assigned to n.

At step 540, if (n=0) is false, namely p is within a pressure range, then go to step 550.

At step 550, if (n=n_old) is false, namely the pressure just enters a new pressure range, a new beating process starts at step 555. When a beating process starts, a variable "beat_count" is set to 0; the function random(min, max) outputs a random value which is assigned to the variable "interval"; and a new timer start to time from 0. Once the beating process started, go to step 588 where the value of n is assigned to n_old (so n_old represents the previous pressure range code) and then go back to step 515 where the pressure sensor provides a new measurement.

At step 550, if (n=n_old) is true, namely the pressure stays in the same pressure range, then go to step 570. At step 570, if (time>=interval) is false, namely the timer has not reached the interval yet, then go to step 588 and then go back to step 515; At step 570, if (time>=interval) is true, namely the timer has reached the interval, then go to step 585 where the beating process will trigger a beat. When the beating process triggers a beat, the beat generator generates a beat (e.g. a vibrator vibrates once with certain magnitude or pattern); the variable "beat_count" is incremented by 1 to reflect the count of the beats passed in this pressure range; the function random(min, max) outputs a new value which is assigned to the variable "interval"; and the timer resets the time to 0. Once the beat completed, go to step 588 and then go back to step 515.

At step 540, if (n=0) is true, namely p is not in any pressure range, then go to step 560.

At step 560, if (n_old=0) is true, namely the previous pressure is not in any pressure range either, go to step 588 and then go back to step 515; if (n_old=0) is false, namely the previous pressure is in a pressure range implying that the pressure just left a pressure range, go to step 580.

At step 580, the beating process stops, and the password is appended with "(n_old, beat_count)" meaning the pressure has stayed in the previous pressure range n_old for passing beat_count beats. Then go to step 588 and then go back to step 515.

This process keep looping through the above steps until the user lifts his or her finger off the touch interface which results in (p=0) at step 520, then the process ends at step 590 and the password is finalized.

Figure 6:
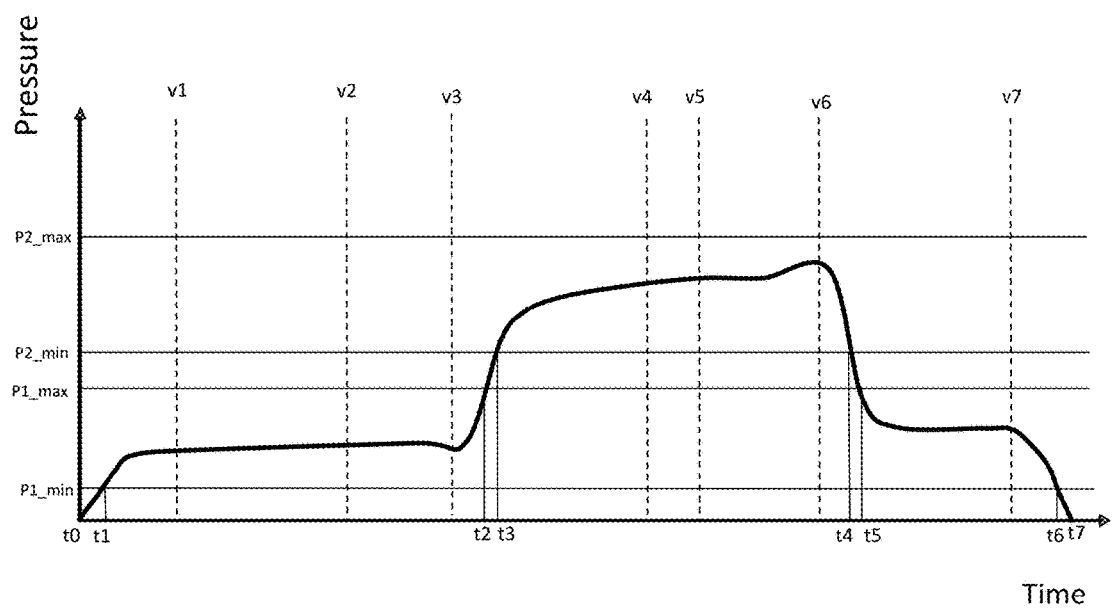
FIG. 6 is a graphic representation of a pressure password in a "2-layer pressure range implementation" of this invention.

Referring to the drawings, FIG. 6 is a graphic representation of a pressure password in a "2-layer pressure range implementation" of this invention.

In FIGS. 6, 7, 8, and 9, x-axis represents the time, and y-axis represents the pressure.

A user presses his or her finger down to a touch interface at time t0. The pressure on the touch interface then increases gradually. When the pressure goes up to P1_min at time t1 (where p=P1_min), namely the pressure enters the pressure range PR1, a beating process starts.

When a beating process starts, the variable "beat_count" is set to 0; the random function random(min, max) outputs a value which is assigned to the variable "interval" (in this case interval=v1−t1), and a new timer starts to time from 0.

When the time reaches v1, namely the interval is reached, the beating process beats once. The beat generator generates a beat; beat_count increments from 0 to 1; the variable "interval" gets another value by running the random function random(min, max); and a new timer starts to time from 0.

The user then holds the pressure in the pressure range PR1 for passing another 2 beats. The beating process beats another 2 times at time v2 and v3 respectively. The user then increases the pressure by further pressing down his or her finger, and leaves the pressure range PR1 at time t2 (where p=P1_max). As soon as the pressure leaves the pressure range PR1, the beating process ends.

The password now is partially encoded as "(1,3)", where the first number "1" represents PR1 and the second number "3" represents 3 beats passed in this pressure range.

The user then increases the pressure and the pressure enters the pressure range PR2 at t3 where p=P2_min. As soon as the pressure enters pressure range PR2, a new beating process starts. The user then holds his or her finger so the pressure stays in the pressure range PR2 for passing 3 beats. The beating process beats at time v4, v5, and v6 respectively. The user then decreases the pressure, and leaves the pressure range PR2 at time t4 where p=P2_min. As soon as the pressure leaves the pressure range PR2, the beating process ends.

"(2,3)" is appended into the password, meaning that the pressure stayed in PR2 for passing 3 beats. The password is now "(1,3), (2,3)".

The user keeps decreasing the pressure and the pressure enters the pressure range PR1 at time t5 (where p=P1_max). As soon as the pressure enters pressure range PR1, a new beating process starts. The user then holds his or her finger so the pressure stays in the pressure range PR1 for passing 1 beat. The beat beats once at time v7. The user then decreases the pressure, and leaves the pressure range PR1 at time t6 (where p=P1_min). As soon as the pressure leaves the pressure range, the beating process ends.

The password now is partially encoded as "(1,3), (2,3), (1,1)", where the newly appended "(1,1)" represents that the pressure stayed in PR1 for passing 1 beat.

The user keeps decreasing the pressure and finally lifts his or her finger from the touch interface at time t7 where p=0.

The password is finalized as "(1,3), (2,3), (1,1)" 690.

Figure 7:
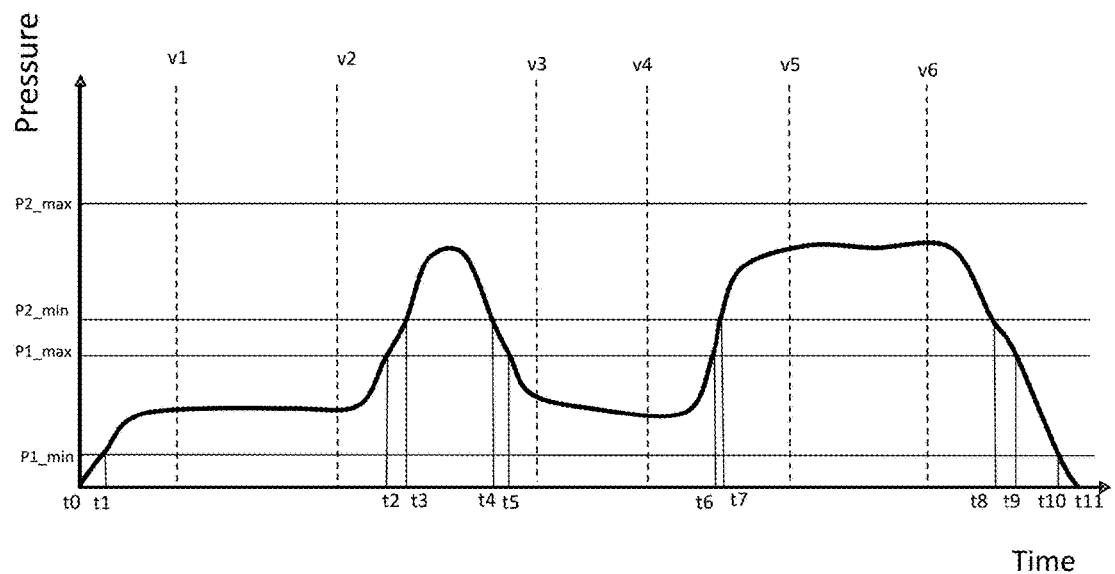
FIG. 7 is a graphic representation of another pressure password in a "2-layer pressure range implementation" of this invention.

FIG. 7 is a graphic representation of another pressure password in a "2-layer pressure range implementation" of this invention. Similarly, the password can be encoded as "(1,2), (2,0), (1,2), (3,2), (1,0)" 790 in which "(2,0)" represents that the pressure enters and then leaves pressure range PR2 at time t3 and t4 respectively without passing any beat, and "(1,0)" represents that the pressure enters and then leaves pressure range PR1 at time t9 and t10 respectively without passing any beat.

Figure 8:
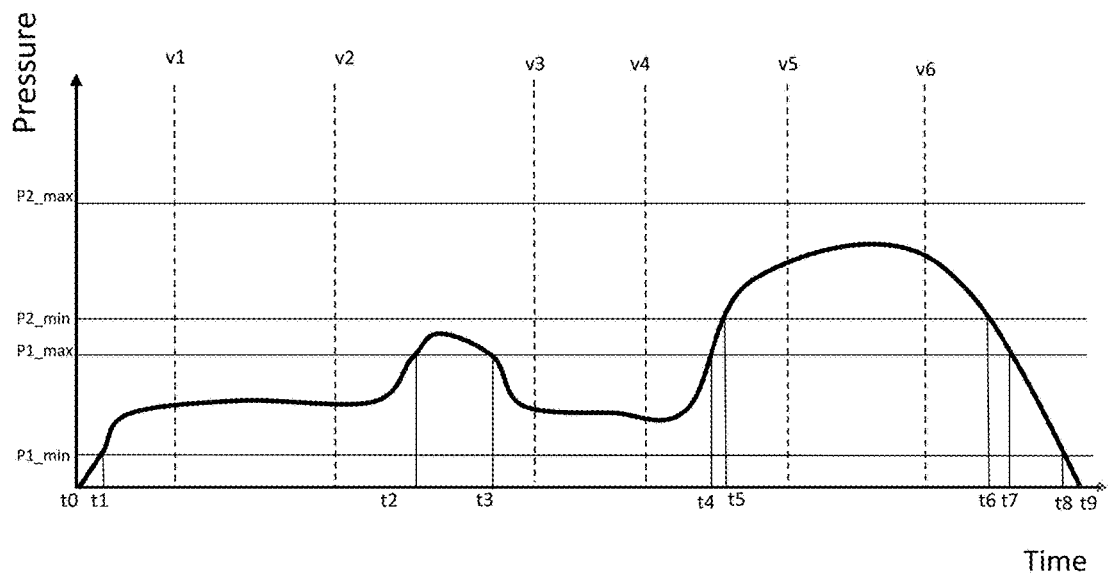
FIG. 8 is a graphic representation of another pressure password in a "2-layer pressure range implementation" of this invention.

FIG. 8 is a graphic representation of another pressure password in a "2-layer pressure range implementation" of this invention. Similarly, the password can be encoded as "(1,2), (1,2), (2,2), (1,0)" 890. When entering this password, the pressure leaves pressure range PR1 at time t2, then gets back into pressure range PR1 at time t3 without getting into pressure range PR2.

Figure 9:
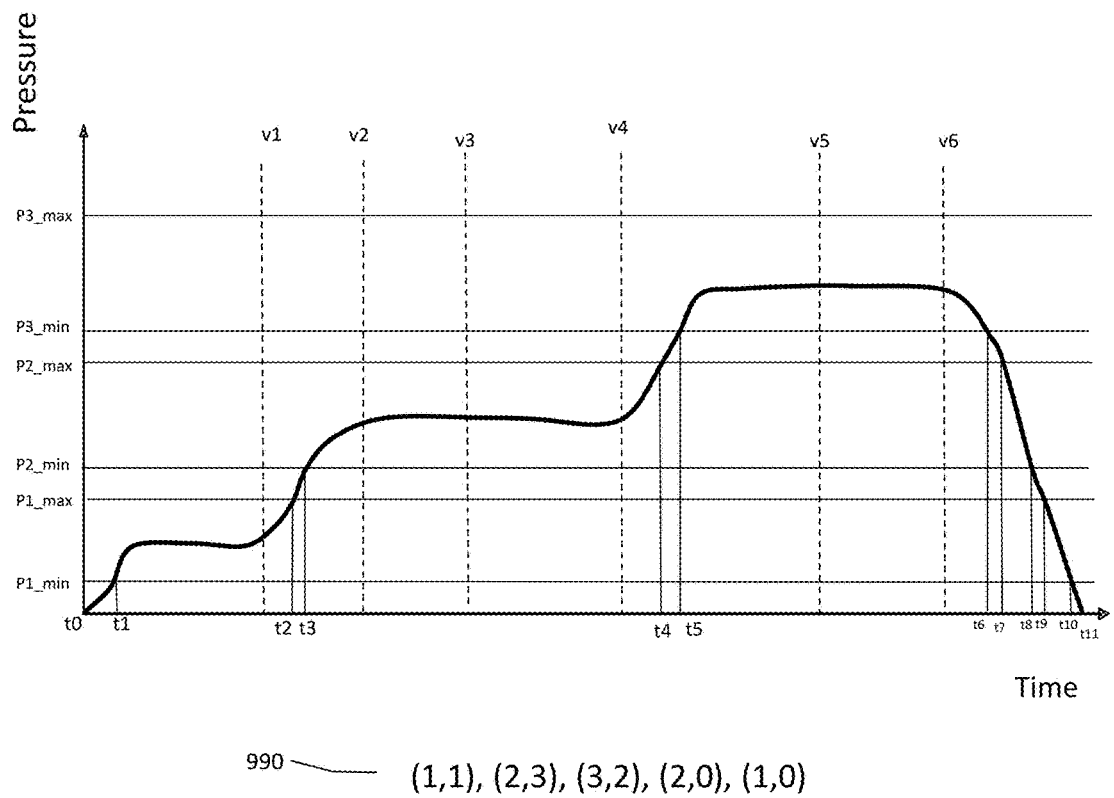
FIG. 9 is a graphic representation of a pressure password in a "3-layer pressure range implementation" of this invention.

Referring to the drawings, FIG. 9 is a graphic representation of a pressure password in a "3-layer pressure range implementation" of this invention.

The user starts pressing the touch interface at t0, enters pressure range PR1, PR2, and PR3 at time t1, t3, and t5 respectively, and holds in the pressure ranges for passing 1, 3, and 2 beats respectively.

The password is encoded as "(1,1), (2,3), (3,2), (2,0), (1,0)" 990.

Certain degree of tolerance (both in temporal and in pressure aspect) might be allowed to make it easy for a user to enter a password with a little delay or minor mistakes. The degree of the tolerance that is allowed can be determined and adjusted in an implementation of this invention to optimize the usability while keeping reasonable security.

This invention may be implemented with multiple touch interfaces. For example, there can be two or more touch buttons on a touch screen of a mobile device, or there can be two or more press buttons on a lock or an ATM machine, so the password can be a sequence or a combination of touch interface number, pressure ranges code, and the count of the beats passed.

The touch interface can be transparent or hidden to further improve the security. For example, on a touch screen of a mobile device, the touch buttons can be transparent; on an electric padlock, an electric door lock, or an ATM machine, the button can be hidden by a physical cover.

Figure 10:
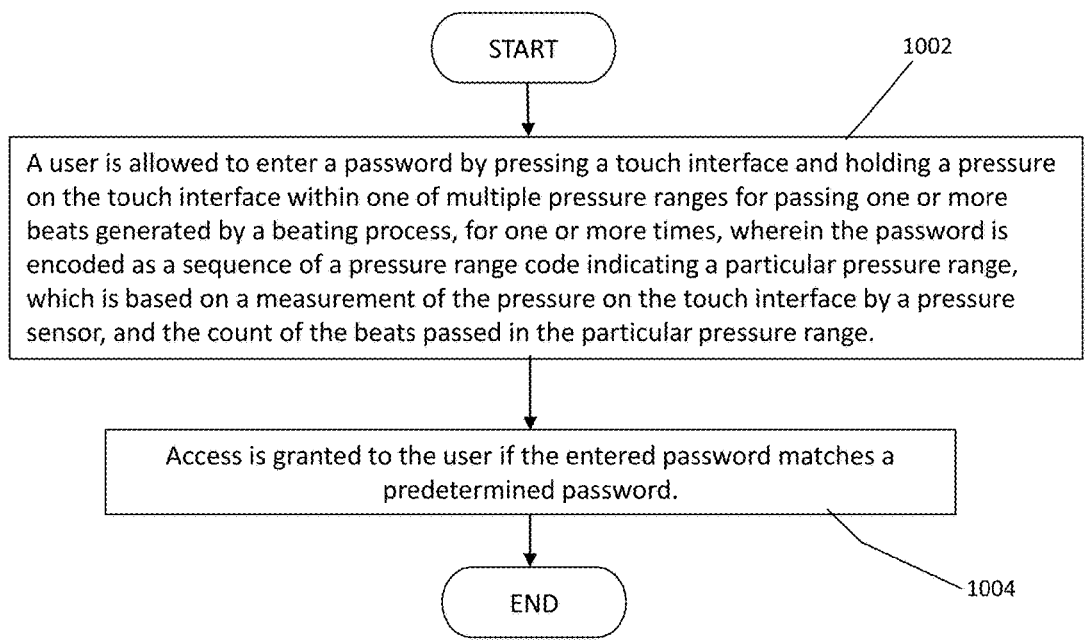
FIG. 10 is a process flow diagram that illustrates a method in accordance with an embodiment of the invention.

FIG. 10 is a process flow diagram that illustrates a method in accordance with an embodiment of the invention. At step 1002, a user is allowed to enter a password by pressing a touch interface and holding a pressure on the touch interface within one of multiple pressure ranges for passing one or more beats generated by a beating process, for one or more times, wherein the password is encoded as a sequence of a pressure range code indicating a particular pressure range, which is based on a measurement of the pressure on the touch interface by a pressure sensor, and the count of the beats passed in the particular pressure range. At step 1004, access is granted to the user if the entered password matches a predetermined password.

An access password is a password, which a user enters to request access to a restricted resource. A file password is a password that stored in a storage means, which may be individually configured by the user or by a system administrator, or may be configured randomly by a processing means. File passwords can be encrypted by a processing means using an encryption algorithm, and the result of the encryption is stored in a storage means to improve the security of passwords. After the user enters his or her access password, processing means encrypts the access password and compares the result with the encrypted file password stored in the storage means, and decides whether the user is granted the access to a restricted resource.

Figure 11:
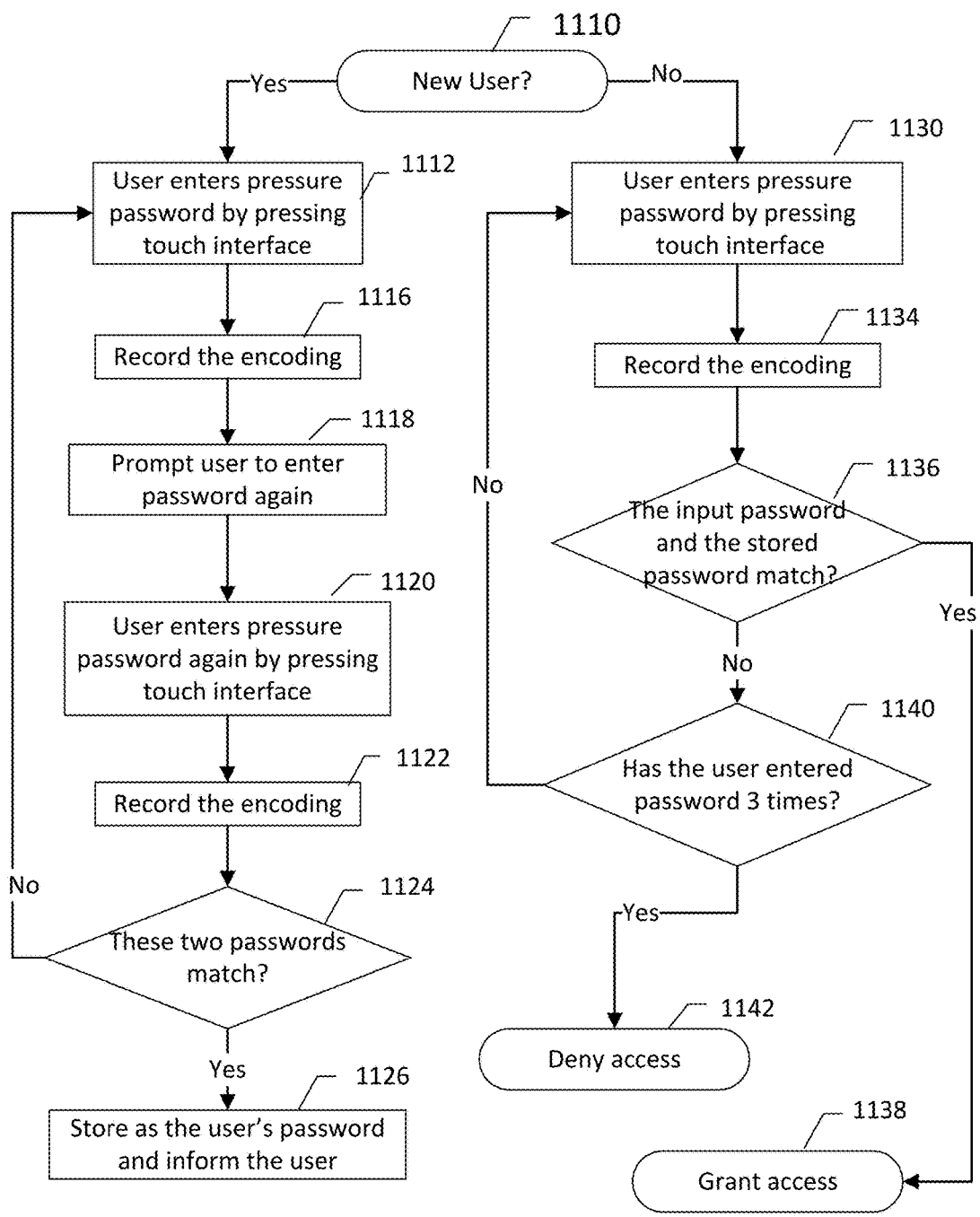
FIG. 11 is a flow diagram illustrating how this invention can be used.

FIG. 11 is a flow diagram to illustrate how this invention can be used as an example.

The steps for a user to create a new file password, for example, may be as follows:

At step 1112, a user enters a pressure password by pressing a touch interface and holding a pressure on the touch interface within one of multiple pressure ranges for passing one or more beats generated by a beating process, for one or more times, wherein the password is encoded as a sequence of a pressure range code indicating a particular pressure range, which is based on a measurement of the pressure on the touch interface by a pressure sensor, and the count of the beats passed in the particular pressure range. After the user completes entering his or her file password, the password encoding is recorded, at step 1116, and the user is prompted to enter his or her file password again, at step 1118. After the user inputs his or her file password for the second time, at step 1120, the password encoding is recorded, at step 1122. These two password encodings are compared by a processing means, at step 1124. If they match, this password encoding is stored in a storage means as the user's new file password, and the user is informed that the file password has been successfully created, at step 1126. If they do not match, the user is informed that these two file passwords do not match and the user is required to input his or her file password again from the beginning, until the user inputs two identical file passwords.

After a new file password is created, a user is required to enter his or her access password before he or she is given access to a restricted resource. After the user completes entering his or her access password by pressing the touch interface at step 1130, the corresponding password encoding is recorded, at step 1134. The processing means compares this access password with the corresponding file password for the user stored in the storage means at step 1136. If they match, the user is granted to access to the restricted resource at step 1138; if they do not match and the user has entered an access password for three times, the user is denied access the restricted resource, at step 1142; if they do not match and the user has not entered the access password for three times, the user is informed that the access password he or she entered is incorrect, and is required to enter his or her access password again. The number of attempts that a user is allowed to enter wrong password consecutively can be predefined. In our example, the times that a user is allowed to enter wrong password consecutively is three.

Throughout the description, similar reference numbers may be used to identify similar elements. Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner. In addition, although specific embodiments of the invention that have been described or depicted include several components described or depicted herein, other embodiments of the invention may include fewer or more components to implement less or more features.

Furthermore, although specific embodiments of the invention have been described and depicted, the invention is not to be limited to the specific forms or arrangements of parts so described and depicted. The scope of the invention is to be defined by the claims appended hereto and their equivalents.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD). Alternatively, embodiments of the invention may be implemented entirely in hardware or in an implementation containing both hardware and software elements. In embodiments which use software, the software may include but is not limited to firmware, resident software, microcode, etc.

What is claimed is:

1. A method for password authentication, the method comprising:
    applying pressure to a touch interface to move from an initial pressure level to a first pressure level wherein the first pressure level is one of a plurality of pressure ranges;
    sensing by the touch interface the applied pressure;
    outputting one or more beats generated by a beating process in response to the detected change in pressure;
    maintaining the applied pressure at the first pressure level for one or more beats;
    changing the applied pressure to a different one of the plurality of pressure ranges;
    recording the first pressure level and the number of beats occurring when the pressure is at the first pressure level to determine a password entry;
    repeating the applying, sensing, outputting, maintaining, changing and recording steps for each password entry if the password includes a plurality of entries;
    comparing the recorded password entries to the entries associated with a stored password; and
    granting access if the comparison of the one or more password entries corresponds with the stored password.

2. The method as recited in claim 1, wherein said beat is a vibration.

3. The method as recited in claim 2, wherein different magnitudes of said vibration represent different said pressure ranges.

4. The method as recited in claim 2, wherein different patterns of said vibration represent different said pressure ranges.

5. The method as recited in claim 1, wherein said beat is a sound.

6. The method as recited in claim 1, wherein said beat is a flashing light.

7. The method as recited in claim 1, wherein the beating process starts when the applied pressure crosses a boundary of one of the plurality of pressure ranges.

8. The method as recited in claim 1, wherein said beating process stops when the pressure leaves a said pressure range.

9. The method as recited in claim 1, wherein the interval of said beatings is randomized.

10. An electronic lock comprising:
   a touch interface configured to allow a user to enter a password by applying pressure to the interface;
   a pressure sensor coupled to the interface to output a pressure level based on the applied pressure;
   a beat generator to output a user perceptible beat;
   a lock control mechanism; and
   a processor for controlling the beat generator and recording one or more password entries wherein the processor senses a change in applied pressure via the pressure sensor to move from an initial pressure level to a first pressure level wherein the first pressure level is one of a plurality of pressure ranges, initiating the beat generator to output one or more beats when the applied pressure is maintained at the first pressure level, recording the first pressure level and the number of beats that was output when the pressure level is maintained at the first pressure level as a password entry and repeating the sensing, initiating, and recording steps for each entry of a password, and enabling the lock control mechanism to unlock the electric lock if the recorded one or more password entries matches a predetermined password.

11. The electric lock as recited in claim 10, wherein said beat is a vibration.

12. The electric lock as recited in claim 11, wherein different magnitudes of said vibration represent different said pressure ranges.

13. The electric lock as recited in claim 11, wherein different patterns of said vibration represent different said pressure ranges.

14. The method as recited in claim 7, wherein the beating process starts when the applied pressure crosses a boundary of one of the plurality of pressure ranges.

15. The electric lock as recited in claim 10, wherein said beating process stops when the pressure leaves a said pressure range.

16. The electric lock as recited in claim 10, wherein the interval of said beatings is randomized.

17. A non-transitory computer-readable medium encoded with instructions that are executable by a processor for password authentication comprising:
   detecting applied pressure to a touch interface to move from an initial pressure level to a first pressure level wherein the first pressure level is one of a plurality of pressure ranges;
   outputting one or more beats generated by a beating process in response to the detected change in pressure;
   recording the first pressure level and the number of beats occurring when the first pressure level is maintained as a password entry;
   repeating the detecting, outputting and recording steps for each password entry for each password entry;
   comparing the recorded entries to the entries associated with a stored password; and
   granting access if the recorded one or more password entries corresponds with the stored password.

18. The non-transitory computer-readable medium as recited in claim 17, wherein said beat is a vibration.

19. The non-transitory computer-readable medium as recited in claim 18, wherein different magnitudes of said vibration represent different said pressure ranges.

20. The non-transitory computer-readable medium as recited in claim 17, wherein the interval of said beatings is randomized.

* * * * *